United States Patent [19]
Miyazaki et al.

[11] 4,405,484
[45] Sep. 20, 1983

[54] ZEOLITE POWDER HAVING HIGH FLOWABILITY, PROCESS FOR PREPARING SAME AND DETERGENT COMPOSITION CONTAINING SAME

[75] Inventors: Hiroshi Miyazaki, Shin Nanyo; Junji Arika, Tokuyama, both of Japan

[73] Assignee: Toyo Soda Manufacturing Co., Ltd., Shin Nanyo, Japan

[21] Appl. No.: 291,073

[22] Filed: Aug. 7, 1981

[30] Foreign Application Priority Data

Aug. 12, 1980 [JP] Japan .................. 55/109814

[51] Int. Cl.³ .................. C11D 3/12; C01B 33/28
[52] U.S. Cl. .................. 252/174.25; 252/140; 252/179; 423/267; 423/328
[58] Field of Search ............ 423/265, 267, 275, 328; 252/140, 179, 174.25, 455 Z; 106/288 B

[56]         References Cited
        U.S. PATENT DOCUMENTS 4,041,135  8/1977  Williams et al. .................. 423/329
4,071,377  1/1978  Schwuger et al. ............ 423/329 X
4,092,261  5/1978  Sperling et al. ................ 423/329 X
4,248,847  2/1981  Derleth et al. ................. 423/328 X Primary Examiner—Edward J. Meros
Attorney, Agent, or Firm—Cushman, Darby & Cushman

[57]             ABSTRACT

A finely divided zeolite powder of high flowability is provided. This zeolite powder is represented by the formula: $Na_2O \cdot Al_2O_3 \cdot nSiO_2 \cdot wH_2O$ ($n = 1.8 \sim 3.0$ and $w = 1 \sim 6$) and comprises at least 99 weight % of particles having a particle size of 1–5 microns and has an aerated bulk density of from 0.3 to about 0.5 g/cc, a degree of cohesiveness of not larger than 56%, and a general flow index (expressed as the sum of indexes of the repose angle, spatula angle, compressibility and degree of cohesiveness) of from 30 to about 50. The zeolite powder is prepared by adding an alkali metal aluminate to an aqueous zeolite slurry containing 30–52 wt. % of zeolite (an anhydride) and having pH of not higher than 12.8; adjusting the pH of the slurry to a value not higher than 11; and then, drying the slurry. The zeolite powder is useful as a builder for detergent.

11 Claims, No Drawings

ZEOLITE POWDER HAVING HIGH FLOWABILITY, PROCESS FOR PREPARING SAME AND DETERGENT COMPOSITION CONTAINING SAME

BACKGROUND OF THE INVENTION (1) Field of the Invention

This invention relates to a novel zeolite powder having high flowability, a process for preparing the zeolite powder and a detergent composition containing the zeolite powder.

(2) Description of the Prior Art

Zeolites are excellent in various properties such as the ion exchange property and absorbing capacity, and they are utilized as catalysts, ion exchangers, adsorbents, etc. in the chemical industry and other various industries.

Zeolites are used in the form of powders, pellets and granules. Powdery zeolites have an especially strong cohesive force among particles and the flowability of powdery zeolites is especially poor, and among various powders, zeolite powders are especially difficult to handle. Accordingly, problems are readily caused by clogging at the transportation (particularly, pneumatic transportation), feeding and storing steps which occupy important portions of the process handling zeolite powders, and therefore, efforts are made to prevent occurrence of clogging.

This clogging phenomenon takes place because of formation of so-called bridges and hindrance of free flowing by these bridges. These bridges are formed owing to an excessively high cohesive force of zeolite powders and a poor flowability. Clogging takes place not only at a discharge opening of a store tank hopper but also through a course of transportation of zeolite powders by a feeder or transporting machine, particularly, by a pneumatic coveyor, and problems are often caused by clogging. Once clogging occurs, the operation adaptability is drastically degraded in the utilization of zeolites.

Various measures for preventing the occurrence of clogging due to bridging have been made in processes handling powders. For example, the shape, dimensions and material of the store tank, the size of the outlet and the inclination angle of the vessel have been taken into consideration, and, for the withdrawal of powders, there are adopted special methods such as a shaking method using BINACTIVATOR (supplied by Vibra Co.) or the like and an air-utilizing method employing a pneumatic knocker or an aeration unit for blowing compressed air.

In the case of zeolites, however, since single particles have such a small size as 1 to 5 microns, and they have a moisture-absorbing property and a very strong cohesive force as pointed out hereinbefore, it is admitted that strong measures for preventing occurrence of bridging are necessary. Accordingly, a zeolite product is handled in the form of an aqueous slurry, or it is once granulated to facilitate handling at the transporting and storing steps and is pulverized again before it is actually used. Thus, special care has to be taken in handling zeolites.

Water-insoluble aluminosilicates (i.e., zeolites) have been proposed to be used as a builder for detergent as taught in Japanese Laid-open patent applications No. 12,381/75, No. 21,009/75, No. 53,404/75 and No. 70,409/75. These known aluminosilicates are represented by the following general formula (2):

$$x'(M'_2O \text{ or } M''O).(Al_2O_3).y'(SiO_2).w'(H_2O) \tag{2}$$

wherein M' stands for an alkali metal, M" stands for an alkaline earth metal exchangeable with calcium, and x', y' and w' signify mole numbers of the respective components and ordinarily, x' is in the range of $0.7 \leq x' \leq 1.5$, y' is in the range of $0.8 \leq y' \leq 6$, and w' is an optional positive number.

Of water-insoluble aluminosilicates represented by the above general formula (2), a completely crystalline 4A type aluminosiicate ($Na_2O.Al_2O_3.2.0SiO_2.4.5H_2O$) is most important and is now popularly used as a detergent builder.

Crystalline aluminosilicates represented by the 4A type aluminosilicate are used in the form of a fine powder having an average particle size of 1 to 10 microns, a spray-dried secondary particle having an average particle size of 100 to 300 microns or an aqueous slurry having a solid content of 40 to 60%. However, these crystalline aluminosilicates have the following defects. Namely, the crystalline aluminosilicate reacts with a silicate such as sodium silicate contained in a detergent composition to increase the method of insoluble matters (this tendency is especially conspicuous when both the aluminosilicate and sodium silicate are co-present in a detergent slurry). Furthermore, if the water content is reduced excessively when the detergent slurry is powdered by spraying, association of the crystalline aluminosilicate takes place and the amount of the insoluble matter is further increased. This insoluble matter, unlike the finely divided crystalline aluminosilicate, is deposited and accumulated on clothes while the clothes are washed repeatedly by using such detergent, and the touch and feel of the clothes is gradually degraded. Since crystalline aluminosilicates are excellent as detergent builders, elimination of these defects has eagerly been desired.

SUMMARY OF THE INVENTION

It is an object of the present invention to provide a finely divided zeolite powder having high flowability in which no clogging is caused and any measure for preventing occurrence of bridging due to a high cohesive force need not be taken particularly in pneumatic transportation, or even if such measure is necessary, bridging can be prevented very simply by a customary method adopted for ordinary powders.

Another object of the present invention is to provide a finely divided zeolite powder which has a reduced tendency of forming insoluble matters when it is incorporated as a builder in a detergent composition.

In accordance with one aspect of the present invention, there is provided a finely divided zeolite powder of high flowability which is represented by the following formula (1):

$$Na_2O.Al_2O_3.nSiO_2.wH_2O$$

wherein n is a number of from 1.8 to 3.0 and w is a number of from 1 to 6.

and which comprises at least 99% by weight of particles having a particle size of 1 to 5 microns and has an aerated bulk density (loose bulk density) of from 0.3 to approximately 0.5 g/cc, preferably from 0.35 to approximately 0.5 g/cc, and more preferably from 0.4 to approximately 0.5 g/cc, a degree of cohesiveness of from 0 to 56%, preferably from 0 to 30%, and the general flow index expressed as the sum of indexes of the repose angle, spatula angle, compressibility and degree of cohesiveness is in the range of from 30 to approximately 50, preferably from 35 to approximately 50.

In accordance with another aspect of the present invention, there is provided a process for the preparation of finely divided zeolite powders of high flowability, which comprises the steps of:

adding on alkali metal aluminate to an aqueous zeolite slurry containing 30 to 52% by weight of zeolite as calculated as the anhydride and having a pH value not higher than 12.8;

adjusting the pH of the slurry to a value of not higher than 11; and then, drying the slurry.

In accordance with still another aspect of the present invention, there is provided a detergent composition which comprises the above-defined finely divided zeolite powder as a builder.

DESCRIPTION OF THE PREFERRED EMBODIMENTS

The flow characteristic of the zeolites, referred to in the present specification, are determined in the following manner.

Values of the basic characteristic properties of the zeolite powder are determined and empirical evaluation points (indexes) are obtained from the so determined values, and the flowability is evaluated based on the general flow index expressed as the sum of these indexes. The values of the physical properties of the zeolite powder are determined by using a powder tester supplied by Hosokawa Funtai Kogaku Kenkyusho according to the following methods.

Bulk Density

A powder is filled into a measuring vessel having a certain volume through an electromagnetic shaker, and the powder accumulated above the vessel is removed by a spatula and the weight is measured to determine the aerated bulk density (i.e., loose bulk density).

The above vessel is attached to a tapping device, and after tapping is conducted for a certain time. Then, the powder accumulated above the vessel is removed by a spatula and the weight is measured to determine the packed bulk density.

Compressibility

The compressibility is calculated from the values of the aerated bulk density and packed bulk density determined according to above-mentioned methods by using the following formula:

$$\text{Compressibility} = \frac{(P - A) \times 100}{P} \ (\%)$$

wherein P stands for the packed bulk density and A stands for the aerated bulk density.

Angle of Repose

A sample powder is let fall on the central portion of a horizontal stand through an electromagnetic shaker, and the angle of repose of a cone of the powder formed on the stand is measured by a protractor.

Angle of Spatula

A rectangular spatula buried in a sample powder is quietly pulled out, and the angle of repose of a roof-shaped mountain of the powder is measured by a protractor.

Degree of Cohesiveness

A predetermined amount of a powder is passed through a sieve by shaking, and the degree of cohesiveness is calculated from the amount of the powder left on the sieve. More specifically, a 200-mesh sieve, a 100-mesh sieve and a 60-mesh sieve are superposed in this order from below, and 2 g of a powder is placed on the topmost sieve and shaken for 20 to 120 seconds. The shaking time T is decided according to the dynamic apparent bulk specific gravity by using the following formula:

$$T(\text{sec.}) = 20 + [(1.6 - \rho W)/0.016]$$

wherein $\rho W$ stands for the dynamic apparent bulk density which is defined by the following formula:

$$\rho W = (P - A) \times \frac{C}{100} + A \ (\text{g/ml})$$

where
P stands for the packed bulk density,
A stands for the aerated bulk density and
C stands for the compressibility.

After the sieving operation, the weights of the powders left on the respective sieves are measured and the percentages of the measured weights to 2 g are calculated. The value obtained with respect to the middle sieve is multiplied by 3/5, and the value obtained with respect to the lowest sieve is multiplied by 1/5. These values obtained with respect to the three sieves are added up to obtain the degree of cohesiveness.

Indexes corresponding to the so determined values of the physical properties are obtained from Table 1, below, and the flowability is evaluated based on the sum of these indexes, that is, the general flow index. Incidentally, data shown in Table 1 are cited from the Flowability Index Table of R. L. Carr, described in the operating manual of the powder tester supplied by Hosokawa Funtai Kogaku Kenkyusho.

TABLE 1

Flow Indexes of Powders

| Degree of Flowability | General Flow Index | Repose Angle degree | Repose Angle index | Compressibility % | Compressibility index | Spatula Angle degree | Spatula Angle index | Degree of Cohesiveness % | Degree of Cohesiveness index |
|---|---|---|---|---|---|---|---|---|---|
| Good | 100 | <25 | 25 | <5 | 25 | <25 | 25 | | |
| ↑ | ↑ | 26~29 | 24 | 6~9 | 23 | 26~30 | 24 | | |
| ↑ | ↑ | 30 | 22.5 | 10 | 22.5 | 31 | 22.5 | | |
| ↑ | ↑ | 31 | 22 | 11 | 22 | 32 | 22 | | |
| ↑ | ↑ | 32~34 | 21 | 12~14 | 21 | 33~37 | 21 | | |
| ↑ | ↑ | 35 | 20 | 15 | 20 | 38 | 20 | | |
| ↑ | ↑ | 36 | 19.5 | 16 | 19.5 | 39 | 19.5 | | |

TABLE 1-continued

Flow Indexes of Powders

| Degree of Flowability | General Flow Index | Repose Angle degree | index | Compressibility % | index | Spatula Angle degree | index | Degree of Cohesiveness % | index |
|---|---|---|---|---|---|---|---|---|---|
| ↑ | ↑ | 37~39 | 18 | 17~19 | 18 | 40~44 | 18 | | |
| ↑ | ↑ | 40 | 17.5 | 20 | 17.5 | 45 | 17.5 | | |
| ↑ | ↑ | 41 | 17 | 21 | 17 | 46 | 17 | | |
| ↑ | ↑ | 42~44 | 16 | 22~24 | 16 | 47~59 | 16 | | |
| ↑ | ↑ | 45 | 15 | 25 | 15 | 60 | 15 | >6 | 15 |
| ↓ | ↓ | 46 | 14.5 | 26 | 14.5 | 61 | 14.5 | 6~9 | 14.5 |
| ↓ | ↓ | 47~54 | 12 | 27~30 | 12 | 62~74 | 12 | 10~29 | 12 |
| ↓ | ↓ | 55 | 10 | 31 | 10 | 75 | 10 | 30 | 10 |
| ↓ | ↓ | 56 | 9.5 | 32 | 9.5 | 76 | 9.5 | 31 | 9.5 |
| ↓ | ↓ | 57~64 | 7 | 33~36 | 7 | 77~89 | 7 | 32~54 | 7 |
| ↓ | ↓ | 65 | 5 | 37 | 5 | 90 | 5 | 55 | 5 |
| ↓ | ↓ | 66 | 4.5 | 38 | 4.5 | 91 | 4.5 | 56 | 4.5 |
| ↓ | ↓ | 67~89 | 2 | 39~45 | 2 | 92~99 | 2 | 57~79 | 2 |
| Bad | 0 | 90 | 0 | >45 | 0 | >99 | 0 | >79 | 0 |

The process for the preparation zeolites according to the present invention will now be described in detail.

Alumina, silica and alkali sources customarily used for the synthesis of zeolites can be used as the starting materials in the present invention, and kinds of the starting materials are not particularly critical but ordinarily, an aqueous solution of an alkali metal aluminate and an aqueous solution of an alkali metal silicate are used as the starting materials.

Commercially available products of an aqueous alkali metal aluminate solution and an aqueous alkali metal silicate solution may be used. Furthermore, aqueous solutions prepared by dissolving an alumina source such as aluminum hydroxide or active alumina or a silica source such as silica sand or hydrous solid silic acid, respectively, by a caustic alkali may be used.

After these aqueous solutions are reacted at 20° to 60° C., crystallization and aging are conducted at 80° to 90° C.

The obtained reaction product is ordinarily in the form of an aqueous slurry containing a zeolite in an amount of approximately 15% by weight as calculated as the anhydride. The zeolite is separated from the mother liquor containing the excessive alkali metal component by filtration. The obtained zeolite is subjected to washing with water or neutralization to remove the residual alkali metal component.

The liquid reaction product prepared by crystallization according to the above-mentioned method contains a large quantity of the excessive alkali metal component, and even if the majority of the excessive alkali metal component is removed by filtration, a considerable amount of the alkali metal component is still left in the zeolite. Such alkali metal component may be removed by washing with water or neutralization as described above, but ordinarily, this removal is accomplished by repeating washing with water.

In the present invention, the alkali metal component is ordinarily removed by washing with water, but this removal can be accomplished by neutralization with an acid such as carbon dioxide gas, dilute sulfuric acid or dilute hydrochloric acid. When this neutralization with an acid is carried out at the stage where the zeolite still contains a salient amount of the alkali metal component left therein, the resulting zeolite product contains large quantities of neutralization products such as an alkali metal carbonate, an alkali metal sulfate and an alkali metal chloride. Accordingly, it is preferred that after the majority of the alkali metal component has been removed by washing with water, neutralization with an acid be carried out. If the removal of the alkali metal component is insufficient, namely, if the pH value of the aqueous slurry containing the zeolite in an amount of 30 to 52% by weight as calculated as the anhydride is higher than 12.8, the viscosity of the aqueous slurry is very high at this step and also at the subsequent steps, various operation problems arise at the subsequent steps and properties of the product, especially the flowability of the zeolite powder, are adversely affected. Accordingly, in the present invention, it is indispensable that the pH of the aqueous slurry should be not higher than 12.8. The pH of the aqueous slurry may be lowered to approximately 11.

As the alkali metal component is removed by washing with water or the like, the pH of the aqueous zeolite slurry is gradually reduced, but when the pH of the aqueous slurry comes close to about 12.8, the variation of the pH according to the zeolite content in the slurry is reduced.

Each of the pH referred to in the instant specification is one as determined on an aqueous zeolite slurry having a zeolite content of 30 to 52% by weight as calculated as the anhydride.

In the present invention, it is important that the zeolite concentration of the aqueous slurry having the thus adjusted pH should be maintained at 30 to 52% by weight and preferably 35 to 50% by weight.

If the aqueous slurry having a zeolite concentration lower than 30% by weight as calculated as the anhydride is subjected to the subsequent treatments, the flowability of the final product is poor. Accordingly, the zeolite concentration should be adjusted to at least 30% by weight. However, if the zeolite concentration exceeds 52% by weight, the viscosity of the slurry is drastically increased and the subsequent operations become difficult, and even if the subsequent operations are conducted, the properties of the finally obtained zeolite powder are degraded. Adjustment of the zeolite concentration in the slurry is accomplished by adjusting the water content in the filter cake, for example, by using a centrifugal dehydrator or a drum type or horizontal belt type vacuum dehydrator.

In addition to the foregoing requirements, the present invention includes another requirement that an alkali metal aluminate should be added to the aqueous slurry having the zeolite concentration thus increased. The amount of the alkali metal aluminate added is 0.1 to 1.5 parts by weight, preferably 0.1 to 1.0 part by weight, as $Al_2O_3$ per 100 parts by weight of the anhydrous zeolite.

A commercially available aqueous solution of sodium aluminate is preferably used as the alkali metal aluminate.

When the amount added of the alkali metal aluminate is smaller than 0.1 part by weight, the flowability is not improved but is as poor as that of the conventional zeolite powders.

In contrast, if an excessively large amount of the alkali metal aluminate is added, the viscosity of the aqueous slurry is drastically increased, and the subsequent operations become difficult and the properties of the zeolite, namely the ion exchange capacity and absorbing capacity, are reduced.

At the subsequent step in the process of the present invention, the pH of the aqueous slurry to which the alkali metal aluminate has been added is adjusted to a value of not higher than 11, preferably not higher than 10.5. If the pH value of the slurry at this step is higher than 11, the intended effects of the present invention cannot be ottained at all. Accordingly, the adjustment of the pH value should be conducted strictly. In this step, the pH of the aqueous slurry may be lowered to approximately 8.

This adjustment of the pH is accomplished by neutralization with an acid such as dilute sulfuric acid, dilute hydrochloric acid or carbon dioxide. The neutralization method comprising contacting the slurry with carbon dioxide gas is most preferred. In this method, it is preferred that neutralization be accomplished within 60 minutes, preferably 40 minutes. If the contact time is longer than 60 minutes, the flowability of the final product is poor.

As described in detail hereinbefore, the process of the present invention has the following indispensable requirements.

(1) The concentration of zeolite in the aqueous slurry is adjusted to 30 to 52% by weight as calculated as the anhydride.

(2) The pH of the aqueous slurry is adjusted to a value of not higher than 12.8.

(3) An alkali metal aluminate is added to the aqueous slurry having the pH thus adjusted to 12.8 or lower.

(4) After addition of the alkali metal aluminate, the pH of the slurry is adjusted in a value of not higher than 11.

Even if any one of these requirements is not satisfied, a zeolite having a high flowability as intended in the present invention cannot be obtained. The zeolite slurry prepared by satisfying the foregoing four requirements is then supplied to the drying step. An air current drier, a spray drier, a fluidizing drier or a steam-heating paddle drier can be used as the drier.

If a granular zeolite of high flowability is desired according to the intended use, the zeolite slurry prepared by satisfying the foregoing requirements may be spray-dried by using a spray drier.

Since conventional zeolite powders are poor in the flowability, special care must be taken to eliminate problems due to the poor flowability in handling them at the transporting and storing steps. For example, when conventional zeolite powders are actually used as detergent builders, in order to obviate these problems, the zeolite powders are once granulated and granules having an improved flowability are handled, and when the zeolites are actually used, the granules are powdered again by pulverization or the like. If the granules obtained according to the conventional method are powdered again, the flowability of the powdered zeolite is much poorer than the powdery zeolite initially obtained by the customary drying method. To our great surprise, it was found that even if granules obtained by drying the zeolite-containing aqueous slurry prepared under the specific conditions of the present invention are powdered in the same manner as described above, the obtained powder has a high flowability which is not different from the flowability of the powder prepared without passage through the granulation step according to the process of the present invention. This is one of characteristic features of the present invention.

Furthermore, the zeolite powder according to the present invention has not only a high flowability but also a high specific gravity, and therefore, the size of a store tank or a product vessel can advantageously be reduced. Also in this point, the present invention is industrially significant.

The zeolite powder according to the present invention, like conventional zeolites, can be used as an adsorbent, filler, catalyst or the like.

As illustrated in the Examples given hereinafter, the zeolite powder according to the present invention has an aerated bulk density of from 0.3 to approximately 0.5 g/cc and a degree of cohesiveness of from 0 to 56%, especially from 0 to 30%. Accordingly, the zeolite powder of the present invention exhibits very high flowability. Furthermore, the zeolite powder of the present invention has such a narrow particle size distribution that the zeolite powder comprises at least 99% by weight of particles having 1 to 5 microns. Therefore, the zeolite powder of the present invention can advantageously be used as a detergent builder.

The present invention will now be described on the detergent composition containing the above-mentioned zeolite powder of high flowability.

The zeolite powder is incorporated into a detergent composition in an amount of 1 to 60% by weight, preferably 2 to 40% by weight and more preferably 5 to 30% by weight, based on the total weight of the detergent composition. In addition to the zeolite powder, known additives for a detergent composition are optionally added according to the intended use.

Kinds of surface active agents to be incorporated in the detergent composition are not particularly limited, and at least one member selected from known surface active agents is incorporated in an amount of 1 to 50% by weight, preferably 5 to 40% by weight, based on the total weight of the detergent composition.

As the anionic surface active agent that can be used in the present invention, the following compounds can be mentioned.

(1) Linear or branched alkylbenzenesulfonic acid salts having an alkyl group having 10 to 16 carbon atoms on the average.

(2) Alkyl-or alkenyl-ethoxysulfuric acid salts having a linear or branched alkyl or alkenyl group having 10 to 20 carbon atoms on the average and having 0.5 to 8 moles on the average of ethylene oxide units added per molecule.

(3) Alkyl-or alkenyl-sulfuric acid salts containing an alkyl or alkenyl group having 10 to 20 carbon atoms on the average.

(4) Olefin-sulfonic acid salts having 10 to 20 carbon atoms on the average in one molecule.

(5) Alkane-sulfonic acid salts having 10 to 20 carbon atoms on the average in one molecule.

(6) Saturated on unsaturated fatty acid salts having 10 to 24 carbon atoms in one molecule.

(7) Alkyl or alkenyl ether carboxylic acid salts containing an alkyl or alkenyl group having 10 to 20 carbon atoms on the average and also containing 0.5 to 8 moles on the average per molecule of added ethylene oxide, propylene oxide, butylene oxide, or ethylene oxide/propylene oxide at a ratio of from 0.1/9.9 to 9.9/0.1 or ethylene oxide/butylene oxide at a ratio of from 0.1/9.9 to 9.9/0.1.

(8) α-Sulfo-fatty acid salts or esters represented by the following formula:

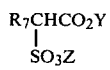

where Y stands for an alkyl group having 1 to 3 carbon atoms or a counter ion of the anionic surface active agent, z stands for a counter ion of the anionic surface active agent, and $R_7$ stands for an alkyl or alkenyl group having 10 to 20 carbon atoms.

As the counter ion of the anionic surface active agent, there can be mentioned ions of alkali metals such as sodium and potassium, ions of alkaline earth metals such as calcium and magnesium, an ammonium ion, and alkanolamines containing 1 to 3 alkanol groups having 2 or 3 carbon atoms, such as monoethanolamine, diethanolamine, triethanolamine and triisopropanolamine.

As the amphoteric surface active agent that can be used in the present invention, the following compounds can be mentioned.

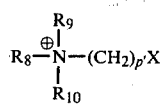

wherein $R_8$ stands for an alkyl or alkenyl group having 10 to 20 carbon atoms, $R_9$ and $R_{10}$ stand for an alkyl group having 1 to 4 carbon atoms, p' is an integer of from 1 to 3, and X stands for a group $-COO^\ominus$ or $-SO_3^\ominus$.

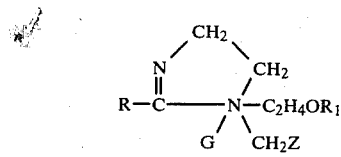

wherein R stands for a fatty acid residue, $R_1$ stands for H, Na and $CH_2COOM$, Z stands for

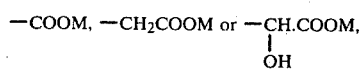

M stands for Na, H or an organic base, and G stands for OH, an acidic salt or an anionic surface active sulfate or sulfation product.

Any of nonionic surface active agents customarily used for detergent compositions can be used. For example, the following compounds can be mentioned.

(A) Polyoxyethylene alkyl or alkenyl ethers containing an alkyl or alkenyl group having 10 to 20 carbon atoms on the average and having 1 to 20 moles of added ethylene oxide.

(B) Polyoxyethylene alkylphenyl ethers containing an alkyl group having 6 to 12 carbon atoms on the average and having 1 to 20 moles of added ethylene oxide.

(C) Polyoxypropylene alkyl or alkenyl ethers containing an alkyl or alkenyl group having 10 to 20 carbon atoms on the average and having 1 to 20 moles of added propylene oxide.

(D) Polyoxybutylene alkyl or alkenyl ethers containing an alkyl or alkenyl group having 10 to 20 carbon atoms on the average and having 1 to 20 moles of added butylene oxide.

(E) Nonionic surface active agents containing an alkyl or alkenyl group having 10 to 20 carbon atoms on the average and having 1 to 30 moles of added ethylene oxide/propylene oxide at a ratio of from 0.1/9.9 to 9.9/0.1 or added ethylene oxide/butylene oxide at a ratio of from 0.1/9.9 to 9.9/0.1.

(F) Higher fatty acid alkanolamides represented by the following general formula or alkylene oxide adducts thereof:

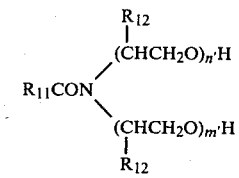

wherein $R_{11}$ stands for an alkyl or alkenyl group having 10 to 20 carbon atoms, $R_{12}$ stands for H or $CH_3$, n' is an integer of from 1 to 3, and m' is an integer of from 0 to 3.

(G) Sucrose fatty acid esters comprised of a fatty acid having 10 to 20 carbon atoms on the average and sucrose.

(H) Fatty acid glycerin monoesters comprised of a fatty acid having 10 to 20 carbon atoms on the average and glycerin.

(I) Alkylamine oxides represented by the following general formula:

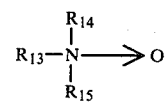

wherein $R_{13}$ stands for an alkyl or alkenyl group having 10 to 20 carbon atoms, and $R_{14}$ and $R_{15}$ stand for an alkyl group having 1 to 3 carbon atoms.

As the cationic surface active agent, the following compounds can be mentioned.

(a) Di-long-chain-alkyl quaternary ammonium salts represented by the following formula:

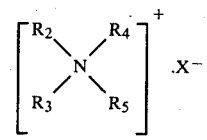

wherein $R_2$ and $R_3$ stand for an alkyl group having 10 to 26 carbon atoms, preferably 14 to 20 carbon atoms, $R_4$ to $R_5$ stand for an alkyl group having 1 to 5 carbons atoms, preferably 1 or 2 carbon atoms, and X stands for a halogen atom, methyl sulfate or ethyl sulfate ($R_2$, $R_3$, $R_4$, $R_5$ and X, occurring hereinafter are as defined above)

(b) Mono-long-chain-alkyl quaternary ammonium salts represented by the following formula:

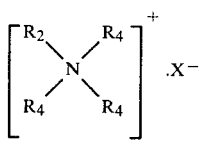

(c) Di-long-chain-alkyl polyoxyethylene quaternary ammonium salts represented by the following formula:

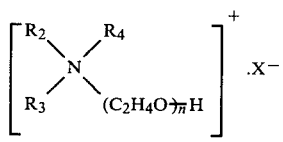

wherein n is a number of from 1 to 20, preferably from 1 to 10 (n occurring hereinafter is as defined above),

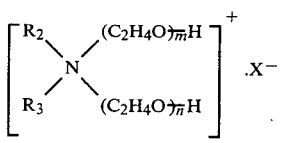

wherein m is a number of from 1 to 20, preferably from 1 to 10 (m occurring hereinafter is as defined above hereinafter).

(d) Mono-long-chain-alkyl polyoxyethylene quaternary ammonium salts represented by the following formula:

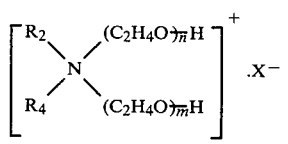

(e) Bis-(hydroxyalkyl) quaternary ammonium salts represented by the following formula:

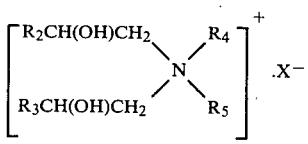

(f) Quaternary ammonium salts having an amide or ester linkage, such as compounds represented by the following formula:

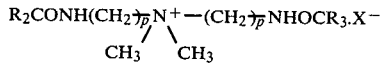

wherein p is a number of from 1 to 5, preferably 2 or 3 (p occurring hereinafter is as defined above),
compounds obtained by reacting a compound of the following formula:

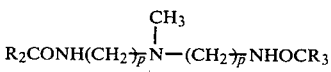

with a compound of the following formula:

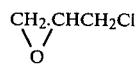

compounds represented by the following formula:

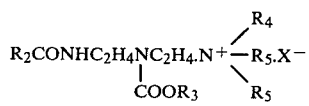

compounds represented by the following formula:

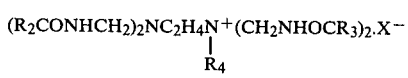

and compounds represented by the following formula:

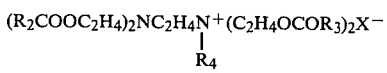

(g) Cationic polyamide compounds obtained by reacting 1 mole of diethylene triamine or dipropylene triamine with about 2 moles of a fatty acid having 12 to 24 carbon atoms, adding about 1 to about 2 moles of epichlorohydrin to the resulting condensate having an acid value of not higher than 10, subjecting the resulting adduct to ring opening polymerization in the presence of an alkaline agent and neutralizing the resulting polymer with a monobasic acid in an amount of 0.3 to 1.5 moles per mole of said amine.

(h) Di-quaternary salts represented by the following formula:

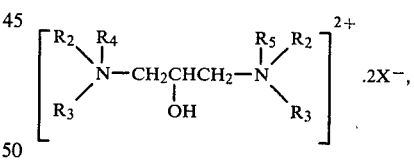

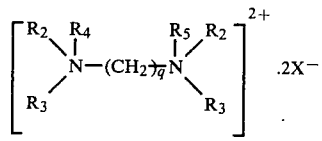

wherein q is a number of from 2 to 8 (q occurring hereinafter is as defined above),

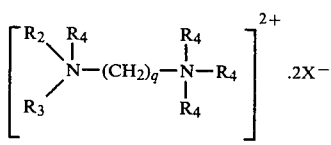

or $$\left[ \begin{array}{c} R_4 \\ | \\ R_2-N-CH_2-B-CH_2-N-R_3 \\ | \\ R_4 \end{array} \begin{array}{c} R_5 \\ | \\ \\ | \\ R_5 \end{array} \right]^{2+} \cdot 2X^-$$

wherein B stands for

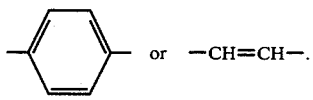

(i) Poly(N,N-dimethyl-3,5-methylene-piperidinium chloride) having an average molecular weight of about 1,000 to about 500,000 and being represented by the following formula:

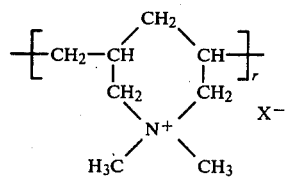

wherein r stands for the number of the recurring units.

(j) Products obtained by quaternizing a copolymer of vinyl pyrrolidone and dimethylaminoethylmethacrylic acid with dimethyl sulfate, which have a molecular weight of about 1,000 to about 500,000 and are represented by the following formula:

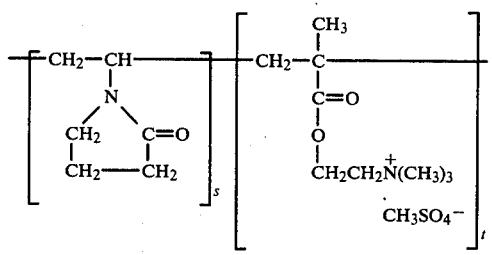

wherein each of s and t represents the number of the recurring units.

(k) Products obtained by quaternarizing an epichlorohydrin adduct of hydroxyethyl cellulose with trimethyl amine, which have a molecular weight of about 200,000 to about 1,000,000 and are represented by the following formula:

$$\text{cellulose}-O-[CH_2CH_2OCH_2\overset{|}{C}HCH_2-\overset{CH_3}{\overset{+|}{N}CH_3}\cdot Cl^-]_r$$
$$\phantom{xxxxxxxxxxxxxxxxxxxxxxxxx}\overset{|}{CH}\phantom{xx}\overset{|}{CH_3}$$

(l) Aminoethyl acrylate phosphate/acrylate copolymers having a molecular weight of about 1,000 to about 500,000 and being represented by the following formula:

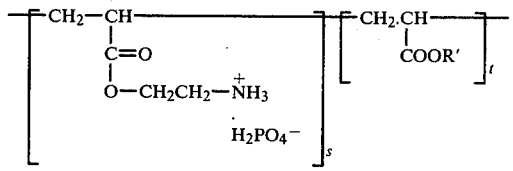

(m) Products obtained by quaternarizing an epichlorohydrin adduct of starch with trimethyl amine, which are represented by the following formula:

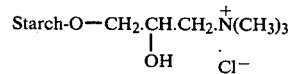

Quaternary ammonium salts represented by the above formulae (a), (b), (c) and (d) are preferred as the cationic surface active agent. As specific examples, there can be mentioned di-beef-tallow-alkyl dimethyl ammonium chloride, mono-beef-tallow-alkyl trimethyl ammonium chloride, di-beef-tallow-alkyl dipolyoxyethylene ammonium chloride and mono-beef-tallow-alkyl monoethyl dipolyoxyethylene ammonium chloride.

At least one member selected from alkali metal salts of condensed phosphoric acids such as tripolyphosphoric acid, pyrophosphoric acid and metaphosphoric acid; alkali metal salts of aminopolyacetic acids such as nitrilotriacetic acid, ethylenediamine-tetraacetic acid and diethylenetriamine-pentaacetic acid; alkali metal salts of hydroxycarboxylic acids such as citric acid, malic acid and glycolic acid; alkali metal salts of ether-carboxylic acids such as diglycolic acid; and alkali metal salts of polymeric electrolytes such as alkali hydrolyzed salts of polyacrylic acid, maleic anhydride/diisobutylene copolymer and vinyl acetate/maleic anhydride copolymer may be added as a builder component in an amount of up to 50% based on the total weight of the detergent composition.

At least one member selected from silicates, carbonates and sulfates may be added as an alkaline agent or inorganic electrolyte to the detergent composition in an amount of 1 to 50% by weight, preferably 5 to 30% by weight, based on the total weight of the detergent composition. Furthermore, an alkanolamine represented by triethanolamine, diethanolamine, monoethanolamine or triisopropanolamine may be added as an organic alkaline agent.

Moreover, at least one member selected from polyethylene glycol, polyvinyl alcohol, polyvinyl pyrrolidone and carboxymethyl cellulose may be added as a re-contamination-preventing agent to the composition in an amount of 0.1 to 5% based on the total weight of the composition.

A bleaching agent such as sodium percarbonate, sodium perborate or hydrogen peroxide adduct of sodium sulfate-sodium chloride, a commercially available fluorescent dye as a whitening agent, a perfume, an enzyme such as protease, amylase or lipase and a bluing agent may be added if necessary.

Furthermore, talc, finely divided silica, clay or calcium silicate (for example, "Microcell" supplied by Johns-Manvill Co.) may be added as a water-insoluble substance, if desired. Moreover, a known finely divided or slurried amorphous aluminosilicate represented by the following formula (u) or (v), which has heretofore been used as a detergent builder, may be added in so far as attainment of the intended effects of the present invention is not inhibited:

$$x(M_2O).Al_2O_3.y(SiO_2).w(H_2O) \qquad (u)$$

wherein M stands for sodium and/or potassium, and x, y and z are values representing the mole numbers of the respective components, x being in the range of $0.7 \leq x \leq 1.2$, y being in the range of $1.6 \leq y \leq 2.8$ and w being an optional positive number inclusive of 0, or $$X(M_2O).Al_2O_3AL_2O_3.Y(SiO_2).Z(P_2O_5).\omega(H_2O) \qquad (v)$$

wherein M stands for Na or K, and X, Y, Z and ω are values representing the mole numbers of the respective components, X being in the range of $0.20 \leq X \leq 1.10$, Y being in the range of $0.20 \leq Y \leq 4.00$, Z being in the range of $0.001 \leq Z \leq 0.80$, and ω being an optional positive number inclusive of 0.

Fluorescent dyes, for example, represented by the following formulae (w), (x) and (y) may be added:

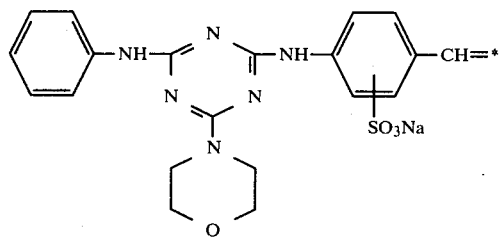

(w)

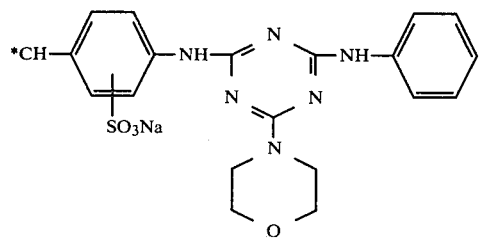

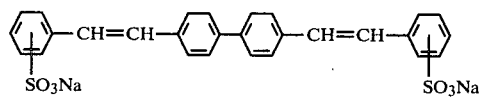

(x)

and

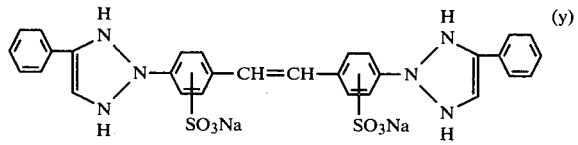

(y)

The process for the preparation of the detergent composition of the present invention is not particularly limited. Namely, known methods may optinally be adopted. For example, the zeolite powder prepared according to the above-mentioned process may be incorporated with the other components of the detergent composition at any step in the preparation of the detergent composition. For example, the zeolite powder may be incorporated in a detergent slurry before spray drying or in a dried product obtained by spray-drying a detergent slurry.

The present invention will now be described in detail with reference to the following Examples that by no means limit the scope of the invention.

EXAMPLE 1

1,024 g of an aqueous solution of sodium aluminate ($Al_2O_3 = 10\%$ by weight, $Na_2O = 4\%$ by weight) maintained at 60° C. was mixed with 1,000 g of an aqueous solution of sodium silicate ($SiO_2 = 12\%$ by weight, $Na_2O = 4\%$ by weight), and reaction was carried out for 1 hour with such stirring that the formed slurry became homogeneous.

Then, the temperature of the formed slurry was elevated and crystallization and aging were conducted at 80° C. for 6 hours.

The zeolite concentration in the obtained zeolite-containing slurry was 14% by weight as calculated as the anhydride.

The slurry was filtered under reduced pressure by using a glass filter, and washing with water was repeated to remove the excessive alkali metal component from the zeolite. Thus, a dehydrated cake having a zeolite content of 58% by weight as calculated as the anhydride was obtained.

Water was added to the dehydrated cake so that the zeolite concentration in the resulting slurry was 47% by weight as calculated as the anhydride. The pH of the slurry at this step was 12.8.

Then, sodium aluminate was added to the slurry in amount of 1.0 part by weight as $Al_2O_3$ per 100 parts by weight of the zeolite anhydride, and carbon dioxide gas was blown into the slurry to effect neutralization until the pH of the slurry was reduced to 10. The time required for blowing of carbon dioxides was 40 minutes.

The slurry having the pH thus adjusted was dried at 150° C. for 4 hours by using a hot air drier. The dried product was pulverized by a Nara type free pulverizer Model M-2 provided with a filter having a mesh size of 0.3 mm to obtain a zeolite powder. This zeolite powder was comprised of at least 99% by weight of particles having a size of 1 to 5 microns, was excellent in flowability and was in the form of a white powder having a water content of 18%. The flowability of the powder was measured by using a powder tester supplied by Hosokawa Funtai Kogaku Kenkyusho. The obtained results are shown in Table 2, below.

EXAMPLE 2

Procedures of Example 1 were repeated in the same manner except that the pH of the slurry having a zeolite concentration of 47% by weight as calculated as the anhydride was changed to 12.0. A white zeolite powder having the same particle size distribution as that of the zeolite powder obtained in Example 1 and a water content of 17.5% was obtained. The results of the flowability test made on this powder are shown in Table 2 below.

EXAMPLE 3

Procedures of Example 1 were repeated in the same manner except that the amount of sodium aluminate as $Al_2O_3$ was changed to 0.1 part by weight based on 100 parts by weight of the zeolite (as the anhydride). A white zeolite powder having the same particle size distribution as that of the zeolite powder obtained in Example 1 and a water content of 18.2% was obtained.

The results of the flowability test made on this powder are shown in Table 2, below.

EXAMPLE 4

Procedures of Example 1 were repeated in the same manner except that the zeolite concentration in the slurry was changed to 40% by weight. A white zeolite powder having the same particle size distribution as that of the zeolite powder obtained in Example 1 and a water content of 17.9% was obtained. The results of the flowability test made on this powder are shown in Table 2, below.

EXAMPLE 5

A zeolite slurry obtained by performing aging according to the same method as described in Example 1 was filtered and washed with water to obtain an aqueous slurry having a zeolite concentration of 47% by weight as calculated as the anhydride. The pH of the slurry at this step was 13.2.

Carbon dioxide gas was blown into the slurry until the pH was reduced to 12.0. The time required for blowing of carbon dioxide gas was 10 minutes.

The step of adding sodium aluminate and the subsequent steps were conducted in the same manner as described in Example 1. A white zeolite powder having the same particle size distribution as that of the zeolite powder obtained in Example 1 and a water content of 17.2% was obtained. The results of the flowability test made on this powder are shown in Table 2, below.

EXAMPLE 6

A zeolite slurry obtained by performing aging according to the same method as described in Example 1 was filtered and washed with water to obtain an aqueous slurry having a zeolite concentration of 47% by weight as calculated as the anhydride. The pH of the slurry at this step was 13.1. A 1 N dilute aqueous solution of sulfuric acid was added to the slurry with stirring until the pH of the slurry was reduced to 12.0.

The step of adding sodium aluminate and the subsequent steps were conducted in the same manner as described in Example 1. A white zeolite powder having the same particle size distribution as that of the zeolite powder obtained in Example 1 and a water content of 16.9% was obtained. The results of the flowability test made on this zeolite powder are shown in Table 2.

Reference Example

In the same manner as described in Example 1, 20 Kg of an aqueous slurry having a zeolite concentration of 47% by weight as calculated as the anhydride, which had been washed with water to such an extent that the pH was reduced to 12.8, was prepared. To the slurry was added sodium aluminate in an amount of 1.0 part by weight as $Al_2O_3$ per 100 parts by weight of the zeolite anhydride, and carboxymethyl cellulose was further added as a binder in an amount of 0.2 parts by weight per 100 parts by weight of the zeolite anhydride. Carbon dioxide gas was blown into the slurry to reduce the pH of the slurry to 10. The time required for blowing of carbon dioxide gas was 40 minutes. The slurry was dried under customary spray-drying conditions to obtain zeolite granules having a particle size of 100 to 300 microns and a water content of 17.0%. In the same manner as described in Example 1, the granules were pulverized by the Nara type pulverizer to obtain a white zeolite powder having a water content of 18.2%. The obtained powder was comprised of at least 99% by weight of particles having a size of 1 to 5 microns and was as excellent in flowability as the zeolite powder obtained in Example 1. The results of the flowability test made on this powder are shown in Table 2, below.

Comparative Example 1

Procedures of Example 1 were repeated in the same manner except that the pH of the slurry having a zeolite concentration of 47% by weight as calculated as the anhydride was changed to 13.0. A white zeolite powder having the same particle size distribution as that of the zeolite powder obtained in Example 1 and a water content of 17.0% was obtained. This powder had a strong cohesive force and a poor flowability. The results of the flowability test made on this powder are shown in Table 2, below.

Comparative Example 2

Procedures of Example 1 were repeated in the same manner except that the zeolite concentration in the aqueous slurry was changed to 14% by weight as calculated as the anhydride. A white zeolite powder having the same particle size distribution as that of the zeolite powder obtained in Example 1 and a water content of 16.0% was obtained. The results of the flowability test made on this powder are shown in Table 2, below.

Comparative Example 3

Procedures of Example 1 were repeated in the same manner except that sodium aluminate was not added. A white zeolite powder having the same particle size distribution as that of the zeolite powder obtained in Example 1 and having a water content of 16.2% was obtained. The obtained powder had a strong cohesive force and the flowability was poor. The results of the flowability test made on this powder are shown in Table 2, below.

Comparative Example 4

Procedures of Example 1 were repeated in the same manner except that sodium zeolite was added in an amount of 2.0 parts by weight as $Al_2O_3$ per 100 parts by weight of the zeolite anhydride. The viscosity was abruptly increased while the pH was adjusted by blowing of carbon dioxide gas, and adjustment of the pH became impossible any longer.

Comparative Example 5

Procedures of Example 1 were repeated in the same manner except that after addition of sodium aluminate, the pH of the slurry was adjusted to 11.3 by blowing of carbon dioxide gas. A white zeolite powder having the same particle size distribution as that of the zeolite powder obtained in Example 1 and a water content of 17.5% was obtained. The zeolite powder had a strong cohesive force and the flowability was poor. The results of the flowability test made on this powder are shown in Table 2, below.

Reference Comparative Example

Procedures of the Reference Example were repeated in the same manner except that the pH value of the slurry having a zeolite concentration of 47% as calcuated as the anhydride was adjusted to 13.2 to obtain zeolite granules having a particle size of 100 to 300 microns and a water content of 16.5%. The granules were pulverized in the same manner as described in the Reference Example to obtain a white zeolite powder having the same particle size distribution as that of the zeolite powder obtained in Example 1 and a water content of 17.2%. This powder had a strong cohesive force and the flowability was poor. The results of the flowability test made on this powder are shown in Table 2, below.

on a Nutsche funnel, and a black cotton broadcloth (count No. 40) in the form of a circle having a diameter of about 6 cm was placed on the filter paper. A filtering apparatus was disposed below the funnel to effect suction. The above-mentioned aqueous solution was poured onto the black cloth and suction filtration was effected. The quantity of the white insoluble residue left

TABLE 2

Results of Flowability Test

| | Apparent Bulk Density (g/cc) | | | Compressibility (%) | | Repose Angle (degrees) | | Spatula Angle (degrees) | | Degree of Cohesiveness (%) | | Sum of Flow Indexes |
|---|---|---|---|---|---|---|---|---|---|---|---|---|
| | aerated | compact | dynamic | measured value | index | measured value | index | measured value | index | measured value | index | |
| Example 1 | 0.47 | 0.80 | 0.62 | 48 | 0 | 45 | 15 | 67 | 12 | 8.2 | 14.5 | 41.5 |
| Example 2 | 0.49 | 0.85 | 0.64 | 42 | 2 | 42 | 16 | 65 | 12 | 4.1 | 15.0 | 45 |
| Example 3 | 0.40 | 0.75 | 0.56 | 50 | 0 | 45 | 15 | 73 | 12 | 8.0 | 14.5 | 41.5 |
| Example 4 | 0.47 | 0.80 | 0.62 | 47 | 0 | 45 | 15 | 65 | 12 | 7.9 | 14.5 | 41.5 |
| Example 5 | 0.42 | 0.79 | 0.59 | 47 | 0 | 46 | 14.5 | 68 | 12 | 12 | 12 | 38.5 |
| Example 6 | 0.41 | 0.76 | 0.56 | 46 | 0 | 46 | 14.5 | 69 | 12 | 15 | 12 | 38.5 |
| Reference Example | 0.42 | 0.75 | 0.56 | 43 | 2 | 45 | 15. | 70 | 12 | 30 | 12 | 41 |
| Comparative Example 1 | 0.25 | 0.64 | 0.49 | 61 | 0 | 49 | 12 | 73 | 12 | 98 | 0 | 24 |
| Comparative Example 2 | 0.29 | 0.67 | 0.51 | 57 | 0 | 48 | 12 | 67 | 12 | 98 | 0 | 24 |
| Comparative Example 3 | 0.25 | 0.64 | 0.49 | 60 | 0 | 47 | 12 | 65 | 12 | 98 | 0 | 24 |
| Comparative Example 4 | — | — | — | — | — | — | — | — | — | — | — | — |
| Comparative Example 5 | 0.26 | 0.65 | 0.50 | 60 | 0 | 48 | 12 | 67 | 12 | 89 | 0 | 24 |
| Reference Comparative Example | 0.25 | 0.64 | 0.49 | 61 | 0 | 50 | 12 | 66 | 12 | 84 | 0 | 24 |

Incidentally, in Table 2, the larger the sum of the flow indexes, the better the flowability.

EXAMPLE 7

Using the zeolite powder prepared in Example 1, a powdery detergent composition was prepared according to the following recipe.

| Recipe of Detergent | |
|---|---|
| Sodium linear-dodecybenzene-sulfonate | 10% |
| Alkyl sulfate ester sodium salt, derived from alcohol derivative (average carbon number = 13.5) according to oxo process | 5% |
| Polyoxyethylene (1) alkyl sulfate ester (same as above) | 5% |
| Sodium salt of hardened beef tallow fatty acid | 2% |
| (Zeolite sodium aluminosilicate, prepared in Example 1) | 20% |
| Sodium silicate (JIS No. 2) | 10% |
| Sodium carbonate | 10% |
| Polyethylene glycol (molecular weight = 6,000) | 1.5% |
| Carboxymethyl cellulose | 1.5% |
| Fluorescent dye | 0.2% |
| Water | 10% |
| Sodium sulfate | balance |

An aqueous slurry containing 60% of a mixture of the above ingredients was dried at a temperature of 60° C. to obtain a powdery detergent. After the powder was dried at 105° C. for 2 hours, the powder contained 2% by weight of volatiles.

Method of Measuring Insoluble Residue

To 100 cc of service-water maintained at 40° C. was added 0.13 g of the powdery detergent, and the mixture was stirred for 10 minutes by a magnetic stirrer to dissolve the powdery detergent. A filter paper was placed on the black cloth was visually determined and evaluated according to the following rating.

| Rating | State of Insoluble Residue |
|---|---|
| 1 | Large quantity of residue left on black cloth and cloth seen white |
| 2 | Small quantity of residue left and cloth seen slightly white |
| 3 | Residue not substantially left and cloth hardly seen white |

The results of the evaluation are shown in Table 1.

TABLE 1

| Zeolite | Evaluation Rating |
|---|---|
| Present invention (prepared in Example 1) | 3 |
| Commercially available product A | 1 |
| Commercially available product B | 1-2 |

EXAMPLE 8

A zeolite was prepared in the same manner as described in Example 1 except that sodium aluminate was added to the zeolite in an amount of 0.5 parts by weight based on 100 parts by weight of the zeolite (as the anhydride). By using this zeolite, a detergent having the following composition described below was prepared by spray-drying an aqueous slurry of the respective ingredients. Supply of the zeolite could be conducted very easily. When a cotton cloth was continuously washed 10 times or 30 times by using the so prepared detergent, degradation of the touch and feel of the cloth was not observed at all.

| Recipe of Detergent | |
|---|---|
| Sodium linear-dodecylbenzene-sulfonate | 10% |
| Sodium α-olefin-sulfonate (C = 16) | 5% |
| Sodium salt of hardened beef tallow fatty acid | 2% |
| Coconut fatty acid monoethanol amide | 3% |
| (Zeolite sodium aluminosilicate) | 15% |
| Sodium silicate (JIS No. 2) | 8% |
| Sodium carbonate | 12% |
| Polyethylene glycol (MW = 6,000) | 2% |
| Carboxymethyl cellulose | 1.5% |
| Fluorescent dye | 0% |
| Water | 10% |
| Sodium sulfate | balance |

We claim:

1. A process for the preparation of finely divided zeolite powders of high flowability in which at least 99% by weight of the zeolite particles have a particle size of about 1 to 5 microns, which comprises the steps of:
   (1) adding about 0.1 to about 1.5 parts by weight (as $Al_2O_3$) of an alkali metal aluminate to 100 parts by weight (as the anhydride) to an aqueous zeolite slurry containing 30 to 52% by weight of zeolite as calculated as the anhydride and having a pH of not higher than 12.8;
   (2) adjusting the pH of the slurry to a value not higher than 11; and then,
   (3) drying the slurry.

2. A process according to claim 1 wherein 0.1 to 1.0 parts by weight (as $Al_2O_3$) of the alkali metal aluminate is added to 100 parts by weight (as the anhydride) of the zeolite.

3. A process according to claim 1 wherein the aqueous zeolite slurry having a pH of not higher than 12.8 is prepared by removing alkali from the reaction product of an aqueous alkali aluminate with an aqueous alkali silicate by filtration and subsequent washing with water.

4. A process according to claim 1 wherein the pH of the slurry is adjusted to a value not higher than 10.5.

5. A process according to claim 1 or 4 wherein the pH of the slurry is adjusted by blowing a carbon dioxide gas into the slurry for a period of within 60 minutes.

6. A zeolite powder of high flowability represented by the following formula:

$$Na_2O \cdot Al_2O_3 \cdot nSiO_2 \cdot wH_2O$$

wherein n is a number of from 1.8 to 3.0 and w is a number of from 1 to 6, and which comprises at least 99% by weight of particles having a particle size of 1 to 5 microns and has an aerated bulk density of from 0 to 56%, and the general flow index expressed as the sum of indexes of the repose angle, spatula angle, compressibility and degree of cohesiveness is in the range of from 30 to approximately 50, said zeolite powder prepared by the process of claim 1.

7. A zeolite powder according to claim 1 wherein the aerated bulk density is in the range of from 0.35 to approximately 0.5 g/cc.

8. A zeolite powder according to claim 1 wherein the aerated bulk density is in the range of from 0.4 to approximately 0.5 g/cc.

9. A zeolite powder according to claim 1 wherein the degree of cohesiveness is in the range of from 0 to 30%.

10. A zeolite powder according to claim 1 wherein the general flow index is in the range of from 35 to approximately 50.

11. A detergent composition comprising, based on the total weight of the composition, 1 to 50% by weight of at least one surface active agent and 1 to 60% by weight of a zeolite, said zeolite being a finely divided powder of high flowability which is represented by the formula:

$$Na_2O \cdot Al_2O_3 \cdot nSiO_2 \cdot wH_2O$$

wherein n is number of from 1.8 to 3.0 and w is a number of from 1 to 6, and which comprises at least 99% by weight of particles having a particle size of 1 to 5 microns and has an aerated bulk density of from 0.3 to approximately 0.5 g/cc, a degree of cohesiveness of from 0 to 56%, and the general flow index expressed as the sum of indexes of the repose angle, spatula angle, compressibility and degree of cohesiveness is in the range of from 30 to approximately 50, said zeolite powder prepared by the process of claim 1.

* * * * *